(12) United States Patent
Olson et al.

(10) Patent No.: US 7,269,174 B2
(45) Date of Patent: Sep. 11, 2007

(54) DYNAMIC WIRELESS NETWORK

(75) Inventors: Jonathan P. Olson, Tucson, AZ (US); Kevin R. Bentley, Oro Valley, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 904 days.

(21) Appl. No.: 10/402,881

(22) Filed: Mar. 28, 2003

(65) Prior Publication Data

US 2004/0190477 A1    Sep. 30, 2004

(51) Int. Cl.
*H04L 12/56* (2006.01)
(52) U.S. Cl. .............................. 370/395.31; 370/395.32
(58) Field of Classification Search ............. 455/426.1, 455/445, 42.2, 11.1; 370/338, 395.31, 395.32, 370/238, 351, 355, 392, 397, 399
See application file for complete search history.

(56) References Cited

U.S. PATENT DOCUMENTS

| | | | | |
|---|---|---|---|---|
| 5,701,106 | A * | 12/1997 | Pikkarainen et al. | 332/100 |
| 5,887,020 | A * | 3/1999 | Smith et al. | 375/130 |
| 6,307,843 | B1 * | 10/2001 | Okanoue | 370/312 |
| 6,570,458 | B2 * | 5/2003 | Cuddy | 331/37 |
| 6,741,638 | B2 * | 5/2004 | Ramberg et al. | 375/150 |
| 6,791,949 | B1 * | 9/2004 | Ryu et al. | 370/254 |
| 6,842,081 | B2 * | 1/2005 | Wang et al. | 331/117 R |
| 7,057,466 | B2 * | 6/2006 | Chien | 331/57 |
| 7,167,696 | B2 * | 1/2007 | Backes et al. | 455/161.1 |
| 2005/0090208 | A1 * | 4/2005 | Liao | 455/112 |

OTHER PUBLICATIONS

Park et al., "A Performance Comparison of the Temporally-Ordered Routing Algorithm and Ideal Link-State Routing," IEEE, Jul. 1998, pp. 592-598.
Lin et al., "A Distributed Architecture for Multimedia in Dynamic Wireless Networks," IEEE, May 1995, pp. 1468-1472.
Akyildiz et al., "A Virtual Topology Based Routing Protocol for Multihop Dynamic Wireless Networks," Wireless Networks, vol. 7, Issue 4, pp. 413-424.

* cited by examiner

*Primary Examiner*—Nick Corsaro
*Assistant Examiner*—Shannon R Brooks
(74) *Attorney, Agent, or Firm*—Quarles & Brady LLP

(57) ABSTRACT

A Dynamically Reconfigurable Dynamic Wireless Network for connecting a local area network ("LAN") to wireless Mobile Stations. Backbone Access Points ("Backbone APs") are physically connected to the LAN. Levels of Wireless Access Points ("Wireless APs") are daisy-chained together and connected to the Backbone AP, providing an extended area of network coverage. Mobile stations are connected to either Backbone APs or Wireless APs. Dynamic Reconfiguration prevents single point failures. Each AP contains a router, Address Resolution Protocol ("ARP") cache, and Distributed Routing Table ("DR Table"). The DR Table maintains the Media Access Control ("MAC") address and the Internet Protocol ("IP") address of each AP below it in the Distributed Routing Tree. Additionally, each DR Table also maintains the IP address for the device each AP is connected. The Distributed Routing Tree is dynamically reconfigured to minimize transmission hops or to maximize signal strength between Mobile Stations and the LAN.

34 Claims, 7 Drawing Sheets

DYNAMIC WIRELESS NETWORK

FIELD OF THE INVENTION

This invention is related in general to the field of wireless communications networks for use with wired local area networks ("LANs"). In particular, the invention consists of a wireless LAN comprised of direct link Access Points ("APs"), virtual link APs, mobile stations, and UHF/VHF broadcast networks.

BACKGROUND OF THE INVENTION

It is well known in the art that wireless transmitters and receivers called Access Points ("APs") may be physically attached to Local Area Networks ("LANs") such as Ethernet networks conforming to IEEE standard 802.3. Following the IEEE 802.11b standard, Mobile Stations may be connected to the APs through the transmission and reception of radio signals.

As Mobile Stations transmit information to an AP, the AP may either broadcast the information to other wirelessly connected Mobile Stations or may pass the information to the attached Ethernet. Signals originating from the wired LAN can be transmitted to Mobile Station by way of the AP. In this manner, a computer, personal digital assistant ("PDA"), or other digital device physically connected to an Ethernet LAN can communicate with Mobile Stations which are wirelessly connected to APs and vice versa. Additionally, Mobile Stations may communicate with other Mobile Stations which are wirelessly connected to the same AP or are connected through the wired LAN to another AP.

The IEEE 802.11b specification allows for the wireless transmission of approximately 11 million bits per second ("Mbps") of digital data at indoor distances up to a few hundred feet and outdoor distances up to tens of miles on a 2.4 gigahertz ("GHz") radio broadcast band. 802.11b is an extension of wired Ethernet, the backbone of most LANs, which is specified by the IEEE 802.3 standard. The wireless broadcast band is primarily used for Internet protocol based communication, but can be used for just about any type of digital communication. The area of effective transmission and reception depends on transmission strength, reception antennae, and line-of-sight obstructions. Other competing technologies making use of the 2.4 GHz broadcast band are BlueTooth and HomeRF.

A standard procedure for regulating data transmission between computing devices is called a communications protocol. While numerous protocols are available for data transmission, all communications protocols must provide for certain core functions. These functions may be implemented differently by different product vendors. An Open Systems Interconnection ("OSI") reference model, created by the International Organization for Standardization ("ISO"), provides the basic model for digital data communications protocols.

The OSI reference model has seven layers, each layer being responsible for different communications functionality. Layer 1 is the Physical layer, defining the hardware, connectors, cables, and signaling specifications. Layer 2 is the Data Link layer, responsible for moving packets of data. The Data Link layer is comprised of two sub-layers: (1) the Media Access Control ("MAC") layer, which assembles bytes of data arriving from the Physical layer into data frames (or, vice versa), and (2) the Logical Link Layer ("LLC"), which arranges data frames into data packets.

Layer 3 is the Network or Internet layer. The Network layer is responsible for routing data packets through communications networks. Routers, operating at this level, can be used to connect communications devices that use different Data Link and Physical layer technology, as the Network layer operates without regard to underlying protocol layers. Each router or other device connected to a digital data communications network, following the OSI model, has a Layer 3 address, called its Internet Protocol ("IP") address.

Layer 4 is the Transport Layer, responsible for creating a virtual communications path between two devices for the transmission of messages. Layer 5 (Session Layer), Layer 6 (Presentation Layer), and Layer 7 (Application Layer), utilize the underlying layers to transmit and receive digital data.

A User Data Protocol ("UDP") is a Transport layer protocol responsible for end-to-end transmission of data on a communications network. It is a best-effort attempt to send data and does not attempt to verify that the target has actually received the message.

Both the IEEE 802.3 wired network standard and the IEEE 802.11 wireless network standard utilize a 6-byte MAC layer hardware addressing scheme. Each device connected to these networks possesses a MAC address. These Layer 2 addresses are unique for each vendor and device and contain no Network layer (Layer 3) routing information. The first three bytes contain a vendor specific designation number and the final three bytes contain the unique device number. The MAC layer address is typically represented by six hexadecimal numbers separated by colons such as:

00:D0:DC:67:72:3F

Although simple communications bridges between two devices may be made using Layer 2 protocols, such simple bridges are inefficient for complex routing involving multiple communications subnets or multiple transmission hops. Additionally, Layer 2 bridges cannot accommodate hardware devices or subnets utilizing different Layer 2 protocols. For efficient Network layer communication, routers generally utilize a Layer 3 protocol such as the Internet Version 4 ("IPV4").

All IPV4 protocol addresses are four bytes long and contain a network address and host identification number:

172.16.0.10

Ultimately, however, a communications network must translate these IPV4 (IP) addresses to MAC (hardware) addresses for data to reach the desired hardware device.

Address Resolution Protocol ("ARP") is the Internet layer protocol (operating at the OSI Network layer) responsible for determining the hardware address (Layer 2 MAC address) which corresponds to a particular IP address. Devices utilizing ARP possess a memory cache containing a translation table for mapping IP addresses into MAC addresses. Before a data packet can be sent to a specific hardware device, the MAC address of the receiving device must be known. Transmitting devices (such as routers) first check their ARP cache to determine whether the MAC address of the target is in its translation table. If the MAC address exists in the table, the message is sent directly to the receiving device.

If the destination's MAC address is not present, the transmitting device sends a Network layer Broadcast Request containing the target's IP (Layer 3) address to all devices attached to the communications network. The communication device which is associated with the IP address then transmits a response which includes its corresponding MAC address. This MAC address is then added to the requesting device's ARP cache table for future use.

ARP messages are either Requests for MAC addresses or Replies providing MAC addresses. Each ARP transmission contains the following fields:

| Field | Size(bits) | Description |
| --- | --- | --- |
| HAS | 16 | Hardware Address Space |
| PAS | 16 | Protocol Address Space |
| HAL | 8 | Hardware Address Length |
| PAL | 8 | Protocol Address Length |
| OP | 16 | Operation Code |
| SMAC | 48 | Source MAC Address |
| SIP | 32 | Source IP Address |
| DMAC | 48 | Destination MAC Address |
| DIP | 32 | Destination IP Address |

The ARP cache maintains a translation table of MAC address and IP address pairs similar to the following:

00:D0:DC:67:72:3F 172.16.200.4
00:D0:DC:67:72:3F 172.17.0.4
00:D0:DC:68:99:73 172.17.0.10
00:D0:DC:27:35:32 172.17.0.11
00:D0:DC:43:89:64 172.17.0.12
00:D0:DC:5B:8F:35 172.17.0.100

In typical bridged communications networks, ARP requests are Broadcast messages (messages transmitted from a single source to all connected communications devices), flooding the entire communications network in order to locate a single device's MAC address. One problem with 802.11 wireless networks is that they incur a high percentage of lost packets (packets which are transmitted by one device, but are not received by the target). For this reason, the 802.11 standard requires the re-transmission of Unicast messages (messages transmitted from a single source device to a single target device) until the target device acknowledges receipt. However, this re-transmission requirement does not apply to Broadcast messages.

802.11 wireless networks typically experience packet loss rates of 10-20%, making broadcast messaging extremely unreliable. The reliability of wireless networks decreases dramatically as messages are re-transmitted along the network, resulting in transmissions. For example, suppose that each wireless transmission experiences a packet loss rate of 20%. For Unicast messages, 1 in 5 packets must be re-transmitted for each transmission. For Broadcast messages, however, each successive transmission results in compounding of the amount of lost packets. After two hops, only 64% of transmissions would reach their target devices. After three hops, the success rate is just slightly greater than 50%. This compound deterioration of packet delivery makes the IEEE 802.11 wireless standard, in and of itself, almost unusable as a transmissions.

An additional problem of multi-hop wireless networks is that they are susceptible to hardware failure, interference, and changes in transmission quality due to atmospheric conditions. If a transmission from a LAN requires multiple retransmissions by APs to reach a Mobile Station, a failure of a single AP will prevent the message from reaching its target. Additionally, if an AP is taken off-line for maintenance, the same result occurs. In a dynamically changing environment, such as a strip-mine site, Mobile Stations sometimes change location so that their transmission path to their associated APs are blocked by terrain, buildings, or vehicles.

For these reasons, it is desirable to have a wireless network system which can dynamically configure itself to adapt to changes in the AP network. It is also desirable to have a wireless network system which is resilient to hardware failures, changes in atmospheric conditions, and interference of transmission paths. It is further desirable to have a wireless network which efficiently transmits messages between Mobile Stations, without flooding the communications network.

BRIEF SUMMARY OF THE INVENTION

The object of this invention is a Dynamic Wireless Network wherein Backbone APs are physically connected to a wired LAN. Level One Wireless APs are wirelessly connected to these Backbone APs by way of radio broadcast transmissions. These Level One Wireless APs may, in turn, be wirelessly connected to Level Two Wireless APs. Each Wireless AP may, in turn, be wireless connected to yet other levels of Wireless APs. In this manner, the range of the Dynamic Wireless Network is extended beyond the range of the Backbone AP alone. This daisy-chain arrangement can also be used to extend the Dynamic Wireless Network around mountains and other line-of-sight obstructions. Mobile Stations may be wirelessly connected to the Backbone APs, Level One Wireless AP, Level Two Wireless AP, or any subsequent Wireless AP.

Each Wireless AP in a daisy-chain carries with it an associated period of delay for acquiring a radio broadcast transmission and re-transmitting it. Each retransmission along a path is referred to as a transmission hop, with multiple retransmissions resulting in "multi-hops". Each Wireless AP dynamically configures its path to the LAN to minimize transmission hops, maximize signal strength, or optimize available bandwidth.

One aspect of this wireless network is the addition of fault tolerance through Dynamic Acquisition. For example, should a Wireless AP lose a viable connection to the LAN, the Dynamic Wireless Network can dynamically reconfigure communications paths between the LAN and Mobile Stations. This is accomplished by downstream Wireless APs searching for other viable paths to the LAN. An alternate path is selected based on minimizing transmission hops, maximizing signal strength, or optimizing available bandwidth.

Another aspect of the invention is a Distributed Routing Tree based on 802.11 associations and the Address Resolution Protocol ("ARP"). The Distributed Routing Tree is formed with Backbone APs at the top, connected to the LAN, and subsequent levels of Wireless APs. Messages traveling from a Backbone AP to Mobile Stations travel downstream through successive levels of Wireless APs. Each AP (both Backbone and Wireless APs) include routers, ARP cache, and Distributed Routing Tables ("DR Tables"). Each DR Table contains the Layer 3 (IP) address and the Layer 2 (MAC) address of each Wireless AP which is downstream from it. Each entry in the DR Table also includes the Layer 3 address of the device to which it is connected. In this manner, each AP knows the routing structure of all APs which are below it.

Information is transmitted through the Distributed Routing Tree using a minimum-hop point-to-point algorithm. This eliminates the necessity for broadcasting ARP Requests to every communication device on the network. ARP Requests are not retransmitted by APs. Receiving an ARP Request indicates that the source of the Request is directly connected to the AP. Once an ARP Request is received by an AP, a new entry is created in the DR Table. This updated table is then propagated upstream, using UDP protocol communications. Each Wireless and Backbone AP in the path to the LAN updates its DR Table to include this new entry.

An additional aspect of the invention to the combining of tradition low-bandwidth UHF and VHF repeater networks into the Dynamic Wireless Network. Legacy UHF and VHF repeater stations are physically connected to Wireless APs which are, in turn, virtually connected to other Wireless APs or physically connected to a Backbone AP. In this manner, remote legacy communications systems may be integrated into the Dynamic Wireless Network.

Therefore, it is a principal object of this invention to provide a Dynamic Wireless Network wherein a combination of Backbone APs and Wireless APs form a Distributed Routing Tree connecting Mobile Stations to a LAN.

It is another object of this invention to provide a Dynamic Wireless Network wherein a Distributed Routing Tree is dynamically configured to minimize transmissions hops, maximize signal strength, or optimize bandwidth.

It is yet another object of this invention to provide a Dynamic Wireless Network wherein a failure of a Wireless AP or Backbone AP results in Dynamic Reconfiguration of the Distributed Routing Tree. The alternate communications paths are selected based on minimization of transmission hops, maximization of signal strength, or optimization of bandwidth.

It is still yet another object of this invention to provide a wireless network wherein each Backbone AP and Wireless AP includes an ARP cache and a DR Table.

An additional object of this invention is to disclose a Dynamic Wireless Network wherein legacy communications systems (UHF and VHF repeater communications stations) are physically attached to either Wireless or Backbone APs, providing a bridge between the LAN and the legacy communications network.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DETAILED DESCRIPTION OF THE INVENTION

Figure 1:
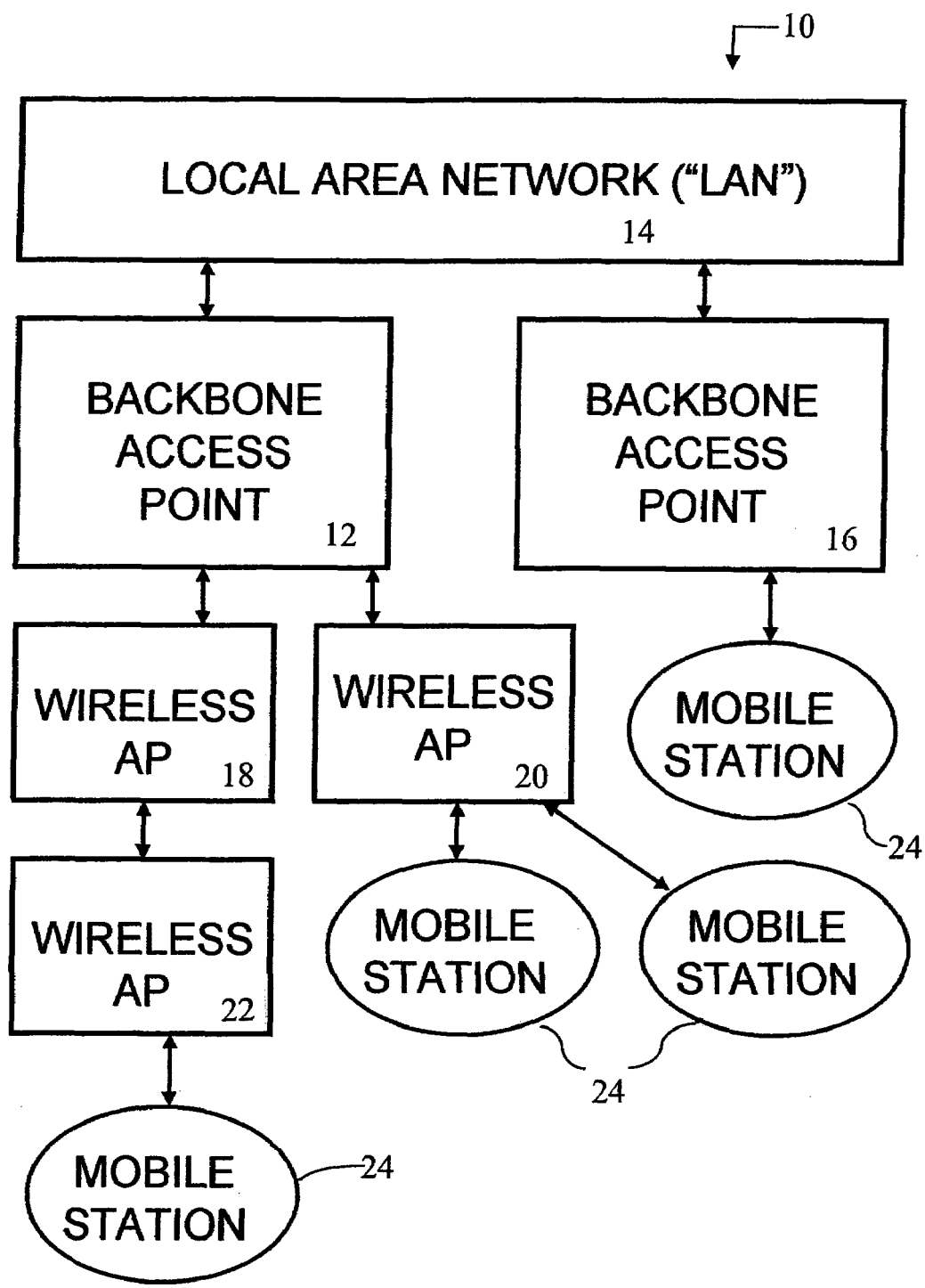
FIG. 1 is a block diagram providing an overview of a Dynamic Wireless Network, according to the invention.

As a general overview of the invention, the block diagram of FIG. 1 shows a Dynamic Wireless Network 10. A first Backbone Access Point ("Backbone AP") 12 is electrically connected to a Local Area Network ("LAN") 14. Optionally, additional Backbone APs 16 may also be connected to the LAN 14. A First Level Wireless Access Point 18 is connected to the first Backbone AP 12 by the transmission and reception of radio frequency ("RF") signals. Other First Level Wireless Access Points 20 may be connected to Backbone APs 12,16. One or more Second Level Wireless Access Points 22 may also be connected to the First Level Wireless Access Points 18,20 using RF signals. In this manner, subsequent levels of Wireless Access Points may be utilized to increase the range and coverage area of the Dynamic Wireless Network 10. The term Access Point ("AP") is used to reference both Backbone APs 12,16 and Wireless APs 18,20,22.

Mobile Stations 24 are portable devices such as laptop personal computers ("PCs"), personal digital assistants ("PDAs"), or wireless telephones which are connected to APs using RF signals. In the preferred embodiment of the invention, digital messages are transmitted between APs, and between Mobile Stations 24 and APs, using wireless communication equipment and protocols that conform to the IEEE 802.11 wireless network standard.

Figure 2:
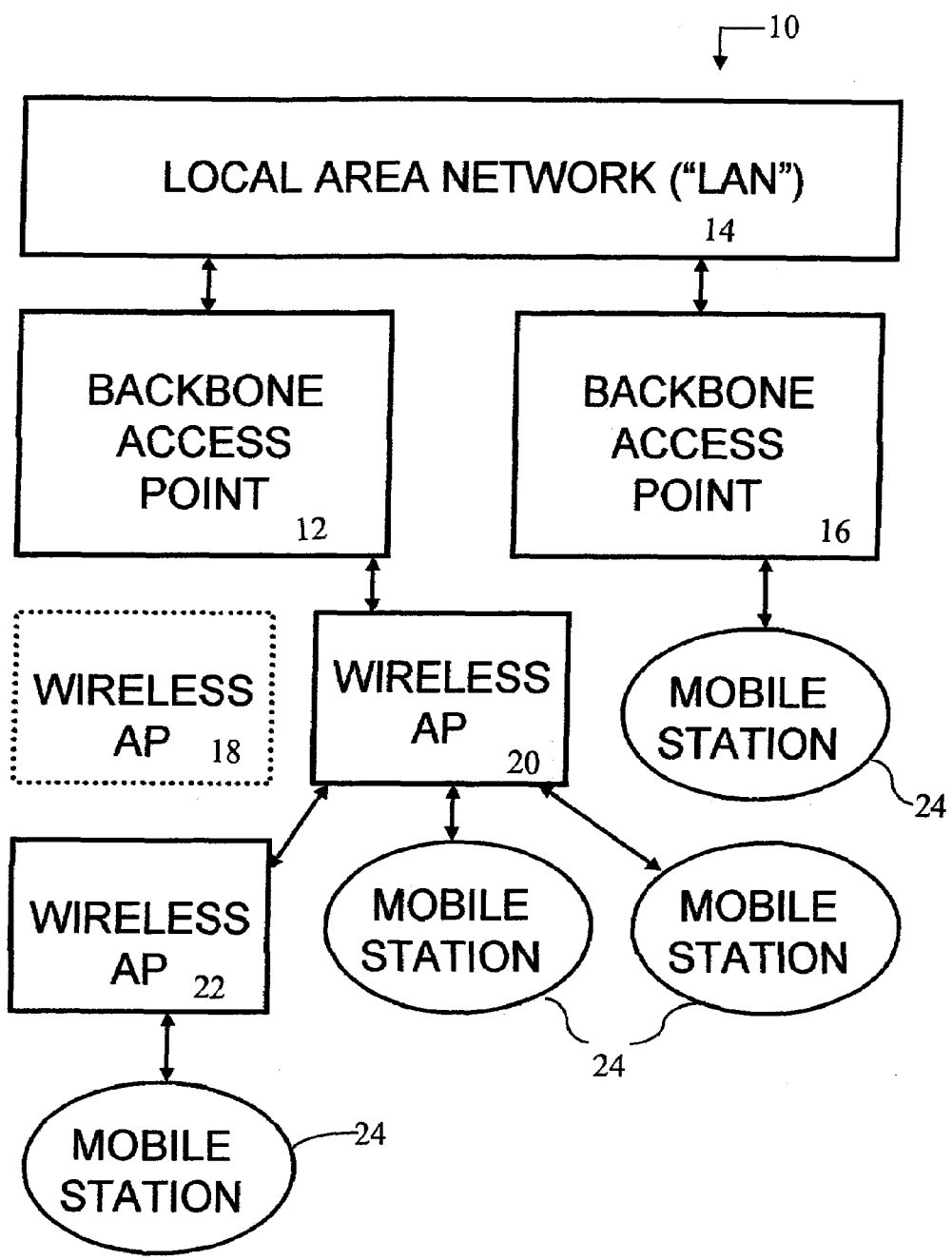
FIG. 2 is a block diagram of the Dynamic Wireless Network of FIG. 1, wherein the Dynamic Wireless Network has been Dynamically Reconfigured.

The Dynamic Wireless Network 10 of FIG. 1 is also illustrated in FIG. 2, with a failure of the First Level Wireless AP 18. This failure may be the result of hardware failure, a change in atmospheric conditions, or deactivation of the AP to perform maintenance on it. For whatever reason, the wireless connection between the First Level Wireless AP 18 and the Backbone AP 12 has been severed. The Second Level Wireless AP 22 and its associated Mobile Station 24 no longer have a viable path to the LAN 14. According to one aspect of the invention, the Dynamic Wireless Network 10 is Dynamically Reconfigured so an alternative communications path is created. In this example, the Second Level Wireless AP 22 creates a communication path through another First Level Wireless AP 20.

Figure 3:
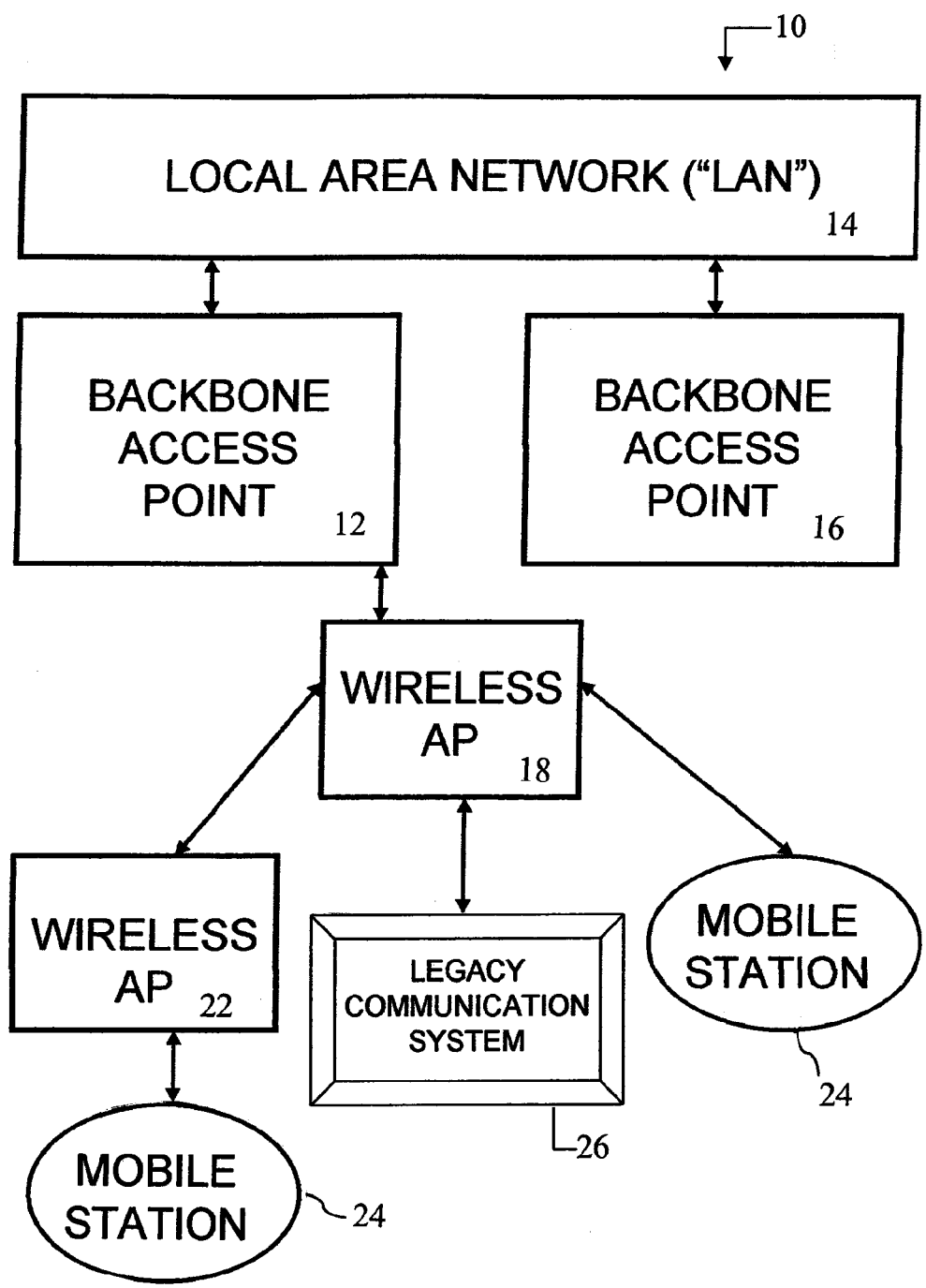
FIG. 3 is a block diagram illustrating the Dynamic Wireless Network of FIG. 1, with an integrated Legacy Communication System, according to the invention.

An alternate embodiment of the Dynamic Wireless Network 10 is illustrated in the block diagram of FIG. 3. A Legacy Communication System 26 has been wirelessly connected to a First Level Wireless AP 18. In the preferred embodiment of the invention, a Legacy Communications System 26 is either a Ultra-High Frequency ("UHF") or Very-High Frequency ("VHF") radio network. Legacy Communication Systems have been in use for many years, for example, in strip mining applications. The present invention provides a means for integrating Legacy Communication Systems 26 into a Dynamic Wireless Network 10, which utilizes more contemporary communications equipment. Alternatively, the Legacy Communication System 26 may be physically connected to a Backbone AP 12,16.

Figure 4:
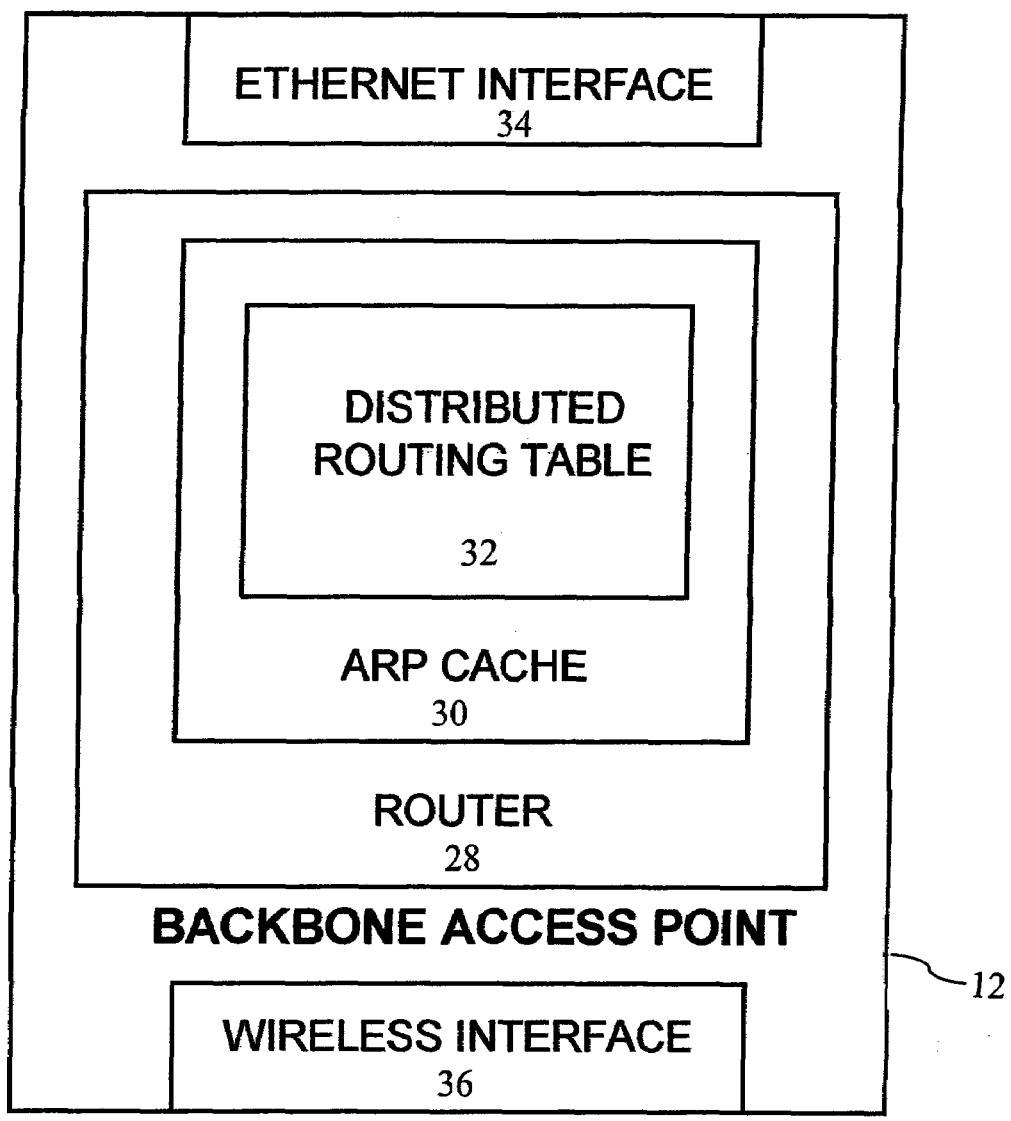
FIG. 4 is a representation of a Backbone Access Point with its associated Router, Address Resolution Protocol cache, and Distributed Routing Table, according to the invention.

The block diagram of FIG. 4 illustrates the components of a Backbone AP 12. Each Backbone AP includes a Router 28 for directing incoming messages to the correct targeted communications device, such as another AP. Each Router 28 maintains an ARP cache 30 which contains a Distributed Routing Table ("DR Table") 32. The DR Table 32 maintains a list of associated APs, their addresses, and their connection scheme. Each Backbone AP 12 also possesses an Ethernet Interface 34 for sending messages to and receiving messages from the LAN 14. The Wireless Interface 36 is used to wirelessly send messages to and receive messages from Wireless APs. Messages sent from the Backbone AP 12 to the LAN are considered to be going "upstream", while messages transmitted to Wireless APs are deemed to be going "downstream."

Figure 5:
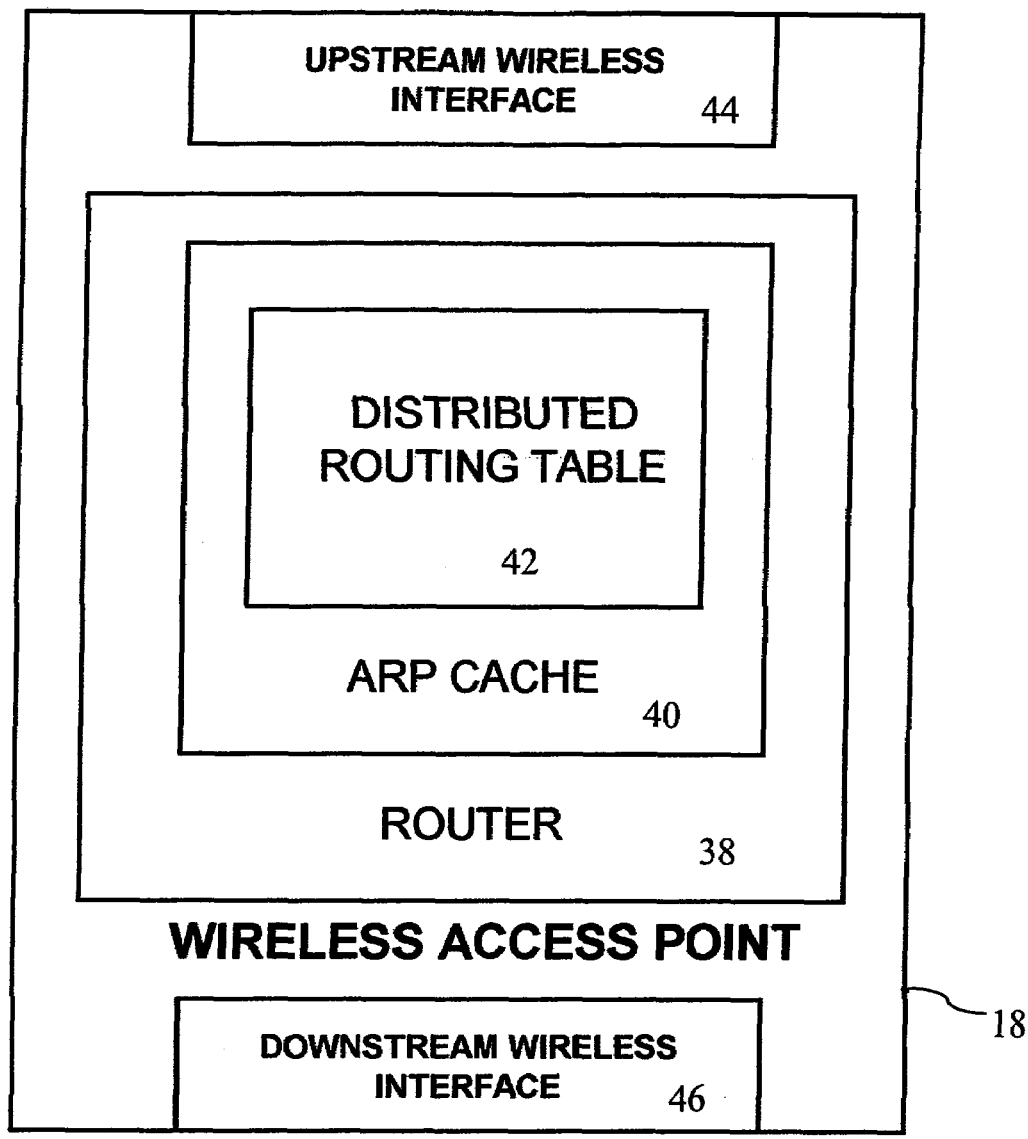
FIG. 5 is an illustration of a Wireless Access Point, similar to the Backbone Access Point of FIG. 4, according to the invention.

The block diagram of FIG. 5 illustrates the components of a Wireless AP 18. Each Wireless AP includes a Router 38 for directing incoming messages to correct targeted communication devices, such as Backbone APs or another Wireless APs. Each Router 38 maintains an ARP cache 40 which contains a Distributed Routing Table ("DR Table") 42. The DR Table 42 maintains a list of associated APs, their addresses, and their connection scheme. Each Wireless AP 18 also possesses an Upstream Wireless Interface 44 for sending messages to and receiving messages from upstream APs. The Downstream Wireless Interface 46 is used to wirelessly send messages to and receive messages from downstream APs. Messages sent from Second Level Wireless APs 22 to First Level Wireless APs 18 are considered to be going upstream, while messages traveling the other direction are deemed to be going downstream. Additionally, messages transmitted from First Level Wireless APs 18 to Backbone APs 12 travel upstream and messages arriving from Backbone APs are going downstream.

Figure 6:
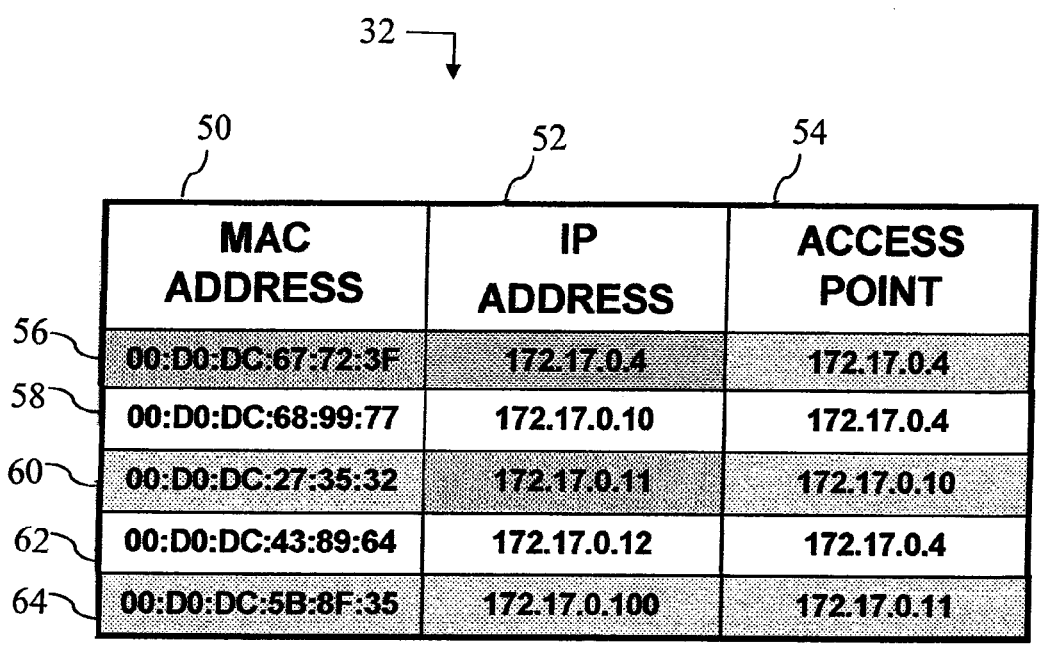
FIG. 6 is a table illustrating the Distributed Routing Table indicated in FIG. 4.

The table of FIG. 6 illustrates the DR Table 32 of a Backbone AP 12. Each row of the table is an entry 56,58, 60,62,64 that represents either a Backbone AP or a Wireless AP. Each entry includes a hardware address 50, an IP address 52, and a connection address 52. The hardware address 50 is the Media Access Control ("MAC") address which corresponds to each-AP in the Dynamic Wireless Network 10. As noted previously, MAC addresses 50 are Layer 2 protocol addresses, according to the OSI system model. The IP addresses 52 are the Layer 3 protocol addresses of each device in the table, corresponding to the network layer of the OSI model. According to the invention, Connection Addresses 54 are the IP addresses of APs to which each device in the DR Table 32 is connected, either electrically or wirelessly.

Figure 7:
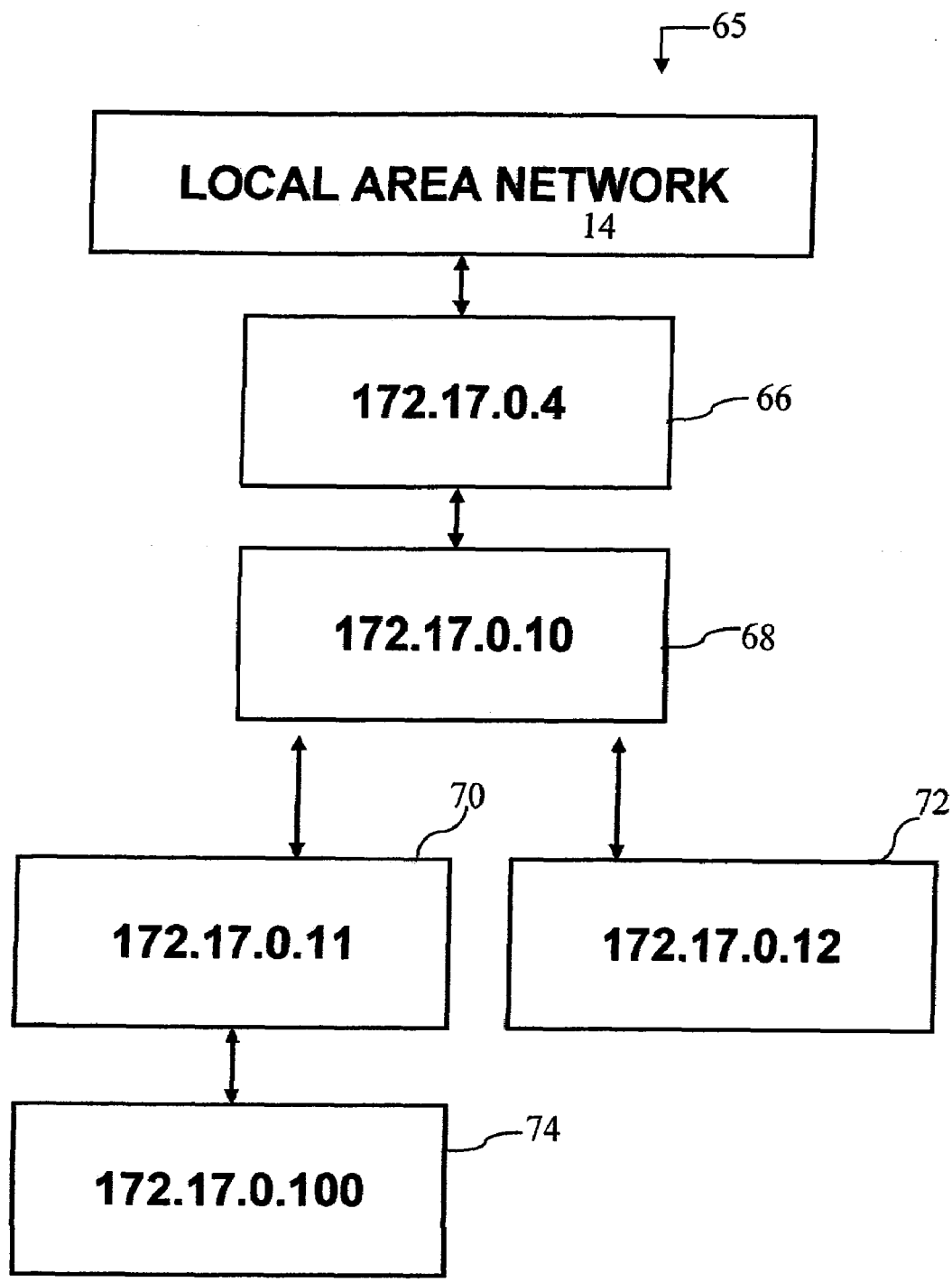
FIG. 7 is a Distributed Routing Tree, according to the invention, which corresponds to the Distributed Routing Table of FIG. 6.

Turning to FIG. 7, a Distributed Routing Tree 65 represents the hierarchical structure of a Dynamic Wireless Network 10, and conforms to the DR Table 32 of FIG. 6. The Backbone AP 66, with its corresponding IP address 52, corresponds to the first entry 56 of the DR Table 32. The upstream interface 34 (FIG. 4) is connected to the LAN 14, while the wireless interface 36 (FIG. 4) is connected to a First Level Wireless AP 68.

The First Level Wireless AP 68, also represented by its IP address 52, relates to the second entry 58 of the DR Table of FIG. 6. The Upstream Wireless Interface 44 (FIG. 5) is connected to the Backbone AP 66 and its Downstream Wireless Interface 46 (FIG. 5) is connected to both Second Level Wireless APs 70,72, as indicated by the Connection Addresses 54 of the DR Table 32. In this embodiment of the invention, a Third Level Wireless AP 74 is connected to the Second Level Wireless AP 70.

The Dynamic Wireless Network 10 configures itself based on current RF conditions and available APs into a minimum depth Distributed Routing Tree 65. By automatically reconfiguring itself, the Network 10 is resilient to hardware failures and changes in RF coverage due to changes in atmospheric conditions. The Dynamic Wireless Network 10 automatically optimizes itself to the current communication environment. Utilizing standard ARP and 802.11 protocols, the Network 10 provides transparent connectivity to all APs.

The Dynamic Wireless Network 10 achieves coverage of large areas, such as those encountered in strip mining environments, by utilizing a tiered system of Backbone APs 12 and Wireless APs. When each AP is activated, its DR Table initially contains only an entry for the instant device. Once activated, each AP will attempt to Dynamically Associate itself with other APs that are upstream from itself. Reliability is achieved by providing redundant APs for forming communications paths. If an AP can no longer maintain a viable communication path, a new optimal Distributed Routing Tree 65 is created. Situations leading to failure of a communication path include (1) hardware failure of an AP, (2) deactivation of an AP for system maintenance, including upgrades to device firmware, (3) physical blockage of an RF transmission path by the interposition of vehicles, (4) atmospheric changes including temperature inversion, and (5) temporary interference by microwave or other RF devices.

To implement Dynamic Reconfiguration, the Dynamic Wireless Network 10 extends the traditional ARP translation table of each AP to include (1) the IP address of the instant device, (2) the IP address of the AP the instant device is connected to, and (3) the number of hops or retransmissions necessary for a message originating at the LAN to the instant device. The number of hops is referred to as the Metric value. Backbone APs 12 are connected to the LAN 14 and transmit wireless beacons according to the IEEE 802.11 specification when the Ethernet network is available. The beacon transmission includes the Metric value of the AP, which, for a Backbone AP 12 is the value of 1.

Wireless APs, once activated, attempt to associate themselves with other, upstream, APs. This is accomplished by monitoring for beacons. If a beacon message is received which possesses sufficient carrier strength, the Wireless AP will its MAC address and IP address via an ADD instruction to facilitate the association. If more than one beacon is received, the Wireless AP will associate itself with the AP which has the smallest Metric value. If a Wireless AP can form a viable connection to a Backbone AP 12, it will always associate with the Backbone AP as it has the smallest possible Metric value of 1. Wireless APs which are associated with Backbone APs are called First Level Wireless APs 18 (FIG. 1). In an alternative embodiment of the invention, the AP will associate itself with the device transmitting a beacon with the best signal quality.

Once a Wireless AP has established an association, meaning it has a viable communication path through a Backbone AP 12 to the LAN 14, it begins transmitting its own beacon. The transmitted beacon also includes a Metric value, which is one more than the Metric value of the device the instant AP is connected to. Downstream APs will not associate with the instant AP until it has associated with an upstream AP.

Second Level Wireless APs 22 (FIG. 1) are associated with First Level Wireless APs 18 and transmit a Metric value of 3. For large or complex coverage area, Wireless APs can be associated to an arbitrary depth. However, each Wireless AP continuously monitors beacons and attempts to associate with APs which will produce a minimum depth Distributed Routing Tree 65 (FIG. 7).

If an AP fails or if a transmission path becomes nonviable, Wireless APs associated with the instant AP will no longer receive 802.11 beacons. Similarly, if the signal quality arriving from an associated AP becomes degraded, the instant AP may terminate its association with the upstream AP. This is accomplished utilizing a REMOVE instruction.

The instant AP simultaneously ceases transmitting its own beacon, placing all downstream devices on notice that they must Dynamically Acquire a new viable path. In this way, the Dynamic Routing Tree 65 adjusts to failure in network conditions to form the current best routing structure.

An AP updates its DR Tables 32,42 (FIGS. 4, 5) when ARP messages, such as REQUEST, are received from other APs. The ARP REQUEST message is an address request by another AP. The ARP REPLY is a gratuitous message transmitted by the instant AP to inform connected devices that a new device entry has been added to its DR Table. According to the invention, ARP REQUEST and REPLY messages are transmitted using Unicast (point-to-point) transmissions. This eliminates the flooding of the Network 10 that would be associated with broadcast ARP messages.

ARP messages are never routed or bridged by an AP. If an ARP message arrives from a downstream AP, the instant AP adds a new entry to its DR Table 32,42 and transmits an ADD instruction to its associated AP. In this manner, each AP always possesses a complete Distributed Routing Tree 65 (FIG. 7) of all APs which are downstream.

Routing between APs occurs at the Network Layer (Layer 3), eliminating the inefficient bridging and flooding of messages typical of Layer 2 bridges. Because each AP maintains a DR Table containing the MAC address of each downstream device, it uses a technique referred to as "Proxy ARP" whereby the AP transmits ARP REPLIES on behalf of its downstream APs.

Another benefit of the expanded DR Table 32,42 (FIGS. 4,5) is that messages originating at one AP need not travel upstream to the LAN and then downstream to the targeted device, if the source and target share a common upstream AP. The message travels upstream to the common AP. The common AP, recognizing that the target device is in it DR Table, transmits the message to the appropriate downstream device.

Another aspect of the invention is the reduction of lost data transmissions inherent in traditional 802.11 broadcast transmissions. The Dynamic Wireless Network 10 utilizes the Distributed Routing Tree 65 (FIG. 7) to reliably deliver broadcast messages. In the present invention, Layer 3 Broadcast messages received by an AP are converted to Layer 2 Unicast messages and transmitted to the MAC address 50 (FIG. 6) of each device in the AP's DR Table 65. Each AP only transmits Layer 2 Broadcast messages to connected Mobile Stations 24 (FIG. 1).

We claim:

1. A Dynamic Wireless Network comprising:
   a Local Area Network ("LAN");
   a Backbone Access Point ("Backbone AP") electrically connected to said LAN;
   a First Level Wireless Access Point ("First Level Wireless AP") including a First Router, said First Router containing a First Address Resolution Protocol ("ARP") cache, said First ARP cache containing a First Distributed Routing Table ("DR Table"), said First DR Table comprising a First Initial Entry, wherein said First Initial Entry comprises a First Media Access Control ("MAC") Address of the First Level Wireless AP, a First Internet Protocol ("IP") Address of the First Level Wireless AP, and a Second IP Address of the Backbone AP;
   a First Wireless Connection for transmitting and receiving radio frequency ("RF") signals, wherein said First Wireless Connection wirelessly connects said First Level Wireless AP to said Backbone AP;
   a Second Level Wireless Access Point ("Second Level Wireless AP") including a Second Router, said Second Router containing a Second Address Resolution Protocol ("ARP") cache, said Second ARP cache containing a Second Distributed Routing Table ("DR Table"), said Second DR Table comprising a Second Initial Entry, wherein said Second Initial Entry comprises a Second Media Access Control ("MAC") address of the Second Level Wireless AP, a Third IP Address of the Second Level Wireless AP, and a Fourth IP Address of the First Level Wireless AP; and
   a Second Wireless Connection for transmitting and receiving RF signals, wherein said Second Wireless Connection wirelessly connects said Second Level Wireless AP to said First Level Wireless AP.

2. The Dynamic Wireless Network of claim 1, further comprising:
   a Mobile Station; and
   a Second Wireless Connection for transmitting and receiving RF signals, wherein said Second Wireless Connection wirelessly connects said Mobile Station to said Backbone AP.

3. The Dynamic Wireless Network of claim 1, further comprising:
   a Mobile Station; and
   a Second Wireless Connection for transmitting and receiving RF signals, wherein said Second Wireless Connection wirelessly connects said Mobile Station to said First Level Wireless AP.

4. The Dynamic Wireless Network of claim 1, further comprising:
   a Mobile Station; and
   a Third Wireless Connection for transmitting and receiving RF signals, wherein said Third Wireless Connection wirelessly connects said Mobile Station to said Second Level Wireless AP.

5. The Dynamic Wireless Network of claim 3, further comprising a plurality of additional Backbone APs, wherein all Backbone APs transmit a First Beacon, said First Beacon possessing a First Signal Quality relative to said First Level Wireless AP, and wherein said First Level Wireless AP wirelessly connects to one of said Backbone APs based on said First Signal Quality.

6. The Dynamic Wireless Network of claim 4, further comprising a plurality of additional First Level Wireless APs, wherein all First Level Wireless APs transmit a First Beacon, said First Beacon possessing a First Signal Quality relative to said Second Level Wireless AP, and wherein said Second Level Wireless AP wirelessly connects to one of said First Level Wireless APs based on said First Signal Quality.

7. The Dynamic Wireless Network of claim 4, wherein said Backbone AP transmits a First Beacon possessing a First Signal Quality relative to said Second Level Wireless AP and a Metric Value of 1, and wherein said First Level Wireless AP transmits a Second Beacon possessing a Second Signal Quality relative to said Second Level Wireless AP and a Metric Value of 2.

8. The Dynamic Wireless Network of claim 7, wherein said Second Level Wireless AP wirelessly connects to said Backbone AP if said First Signal Quality is sufficient to maintain a viable connection.

9. The Dynamic Wireless Network of claim 8, wherein said Second Level Wireless AP wirelessly connects to said First Level Wireless AP if said First Signal Quality is insufficient to maintain a viable connection and said Second Signal Quality is sufficient to maintain a viable connection.

10. The Dynamic Wireless Network of claim 4, further comprising:
a plurality of additional Backbone APs, wherein all Backbone APs transmit a First Beacon, said First Beacon possessing a First Signal Quality relative to said Second Level Wireless AP and a Metric Value of 1; and
a plurality of additional First Level Wireless APs, wherein all said First Level Wireless APs transmit a Second Beacon, said Second Beacon possessing a Second Signal Quality relative to said Second Level Wireless AP and a Metric Value of 2.

11. The Dynamic Wireless Network of claim 10, wherein said Second Level Wireless AP wirelessly connects to one of said Backbone APs if said First Signal Quality is sufficient to maintain a viable connection.

12. The Dynamic Wireless Network of claim 10, wherein said Second Level Wireless AP wirelessly connects to one of said First Level Wireless APs if said Second Signal Quality is sufficient to maintain a viable connection and all First Signal Qualities are insufficient to maintain a viable connection.

13. The Dynamic Wireless Network of claim 11, wherein said Second Level Wireless AP disconnects from said one of said Backbone APs if said First Signal Quality becomes insufficient to maintain a viable connection.

14. The Dynamic Wireless Network of claim 13, wherein said Second Level Wireless AP connects to an other of said Backbone APs if said First Signal Quality associated with said other of said Backbone APs is sufficient to maintain a viable connection.

15. The Dynamic Wireless Network of claim 12, wherein said Second Level Wireless AP disconnects from said one of said First Level Wireless APs if said Second Signal Quality becomes insufficient to maintain a viable connection.

16. The Dynamic Wireless Network of claim 14, wherein said Dynamic Wireless Network is organized as a minimum depth Distributed Routing Tree.

17. The Dynamic Wireless Network of claim 3, further comprising a Legacy Communication System electrically connected to said Backbone AP.

18. The Dynamic Wireless Network of claim 3, further comprising a Legacy Communication System wirelessly connected to said First Level Wireless AP.

19. The Dynamic Wireless Network of claim 17, wherein said Legacy Communication System is an Ultra-High Frequency ("UHF") broadcast network.

20. The Dynamic Wireless Network of claim 17, wherein said Legacy Communication System is a Very-High Frequency ("VHF") broadcast network.

21. The Dynamic Wireless Network of claim 16, wherein all Backbone APs include a Third DR Table, and wherein said Third DR Table includes an Entry for each Access Point ("AP") which is downstream.

22. The Dynamic Wireless Network of claim 16, wherein each of said Additional First Level Wireless APs includes a First DR Table, and wherein each said First DR Table includes an Entry for each Access Point ("AP") which is downstream.

23. The Dynamic Wireless Network of claim 16, wherein each said Second DR Table of all Second Level Wireless APs includes an Entry for each Access Point ("AP") which is downstream.

24. A Dynamic Wireless Network comprising:
a Local Area Network ("LAN");
a Backbone Access Point ("Backbone AP") electrically connected to said LAN;
a First Level Wireless Access Point ("First Level Wireless AP") including a First Router, said First Router containing a First Address Resolution Protocol ("ARP") cache, said First ARP cache containing a First Distributed Routing Table ("DR Table"), said First DR Table comprising a First Initial Entry, wherein said First Initial Entry comprises a First Media Access Control ("MAC") Address of the First Level Wireless AP, a First Internet Protocol ("IP") Address of the First Level Wireless AP, and a Second IP Address of the Backbone AP;
a First Wireless Connection for transmitting and receiving radio frequency ("RF") signals, wherein said First Wireless Connection wirelessly connects said First Level Wireless AP to said Backbone AP; and
a plurality of additional Backbone APs, wherein all Backbone APs transmit a First Beacon, said First Beacon possessing a First Signal Quality relative to said First Level Wireless AP, and wherein said First Level Wireless AP wirelessly connects to one of said Backbone APs based on said First Signal Quality.

25. The Dynamic Wireless Network of claim 24, further comprising:
a Mobile Station; and
a Second Wireless Connection for transmitting and receiving RF signals, wherein said Second Wireless Connection wirelessly connects said Mobile Station to said Backbone AP.

26. The Dynamic Wireless Network of claim 24, further comprising:
a Mobile Station; and
a Second Wireless Connection for transmitting and receiving RF signals, wherein said Second Wireless Connection wirelessly connects said Mobile Station to said First Level Wireless AP.

27. A Dynamic Wireless Network comprising:
a Local Area Network ("LAN");
a Backbone Access Point ("Backbone AP") electrically connected to said LAN;
a First Level Wireless Access Point ("First Level Wireless AP") including a First Router, said First Router containing a First Address Resolution Protocol ("ARP") cache, said First ARP cache containing a First Distributed Routing Table ("DR Table"), said First DR Table comprising a First Initial Entry, wherein said First Initial Entry comprises a First Media Access Control ("MAC") Address of the First Level Wireless AP, a First Internet Protocol ("IP") Address of the First Level Wireless AP, and a Second IP Address of the Backbone AP;
a First Wireless Connection for transmitting and receiving radio frequency ("RF") signals, wherein said First Wireless Connection wirelessly connects said First Level Wireless AP to said Backbone AP;
a Second Level Wireless Access Point ("Second Level Wireless AP") including a Second Router, said Second Router containing a Second Address Resolution Protocol ("ARP") cache, said Second ARP cache containing a Second Distributed Routing Table ("DR Table"), said Second DR Table comprising a Second Initial Entry, wherein said Second Initial Entry comprises a Second Media Access Control ("MAC") address of the Second Level Wireless AP, a Third IP Address of the Second Level Wireless AP, and a Fourth IP Address of the First Level Wireless AP;
a Second Wireless Connection for transmitting and receiving RF signals, wherein said Second Wireless Connection wirelessly connects said Second Level Wireless AP to said First Level Wireless AP;

a Mobile Station; and a Third Wireless Connection for transmitting and receiving RF signals, wherein:

said Third Wireless Connection wirelessly connects said Mobile Station to said Second Level Wireless AP, said Backbone AP transmits a First Beacon possessing a First Signal Quality relative to said Second Level Wireless AP and a Metric Value of 1, and said First Level Wireless AP transmits a Second Beacon possessing a Second Signal Quality relative to said Second Level Wireless AP and a Metric Value of 2, said Second Level Wireless AP wirelessly connects to said Backbone AP if said First Signal Quality is sufficient to maintain a viable connection, and said Second Level Wireless AP wirelessly connects to said First Level Wireless AP if said First Signal Quality is insufficient to maintain a viable connection and said Second Signal Quality is sufficient to maintain a viable connection.

28. The Dynamic Wireless Network of claim 27, further comprising:

a plurality of additional Backbone APs, wherein all Backbone APs transmit a First Beacon, said First Beacon possessing a First Signal Quality relative to said Second Level Wireless AP and a Metric Value of 1; and a plurality of additional First Level Wireless APs, wherein all said First Level Wireless APs transmit a Second Beacon, said Second Beacon possessing a Second Signal Quality relative to said Second Level Wireless AP and a Metric Value of 2.

29. The Dynamic Wireless Network of claim 28, wherein said Second Level Wireless ZAP wirelessly connects to one of said Backbone APs if said First Signal Quality is sufficient to maintain a viable connection.

30. The Dynamic Wireless Network of claim 28, wherein said Second Level Wireless ZAP wirelessly connects to one of said First Level Wireless APs if said Second Signal Quality is sufficient to maintain a viable connection and all First Signal Qualities are insufficient to maintain a viable connection.

31. The Dynamic Wireless Network of claim 30, wherein said Second Level Wireless AP disconnects from said one of said Backbone APs if said First Signal Quality becomes insufficient to maintain a viable connection.

32. The Dynamic Wireless Network of claim 31, wherein said Second Level Wireless AP connects to an other of said Backbone APs if said First Signal Quality associated with said other of said Backbone APs is sufficient to maintain a viable connection.

33. The Dynamic Wireless Network of claim 30, wherein said Second Level Wireless AP disconnects from said one of said First Level Wireless APs if said Second Signal Quality becomes insufficient to maintain a viable connection.

34. The Dynamic Wireless Network of claim 32, wherein said Dynamic Wireless Network is organized as a minimum depth Distributed Routing Tree.

* * * * *